United States Patent Office 3,014,485
Patented Dec. 26, 1961

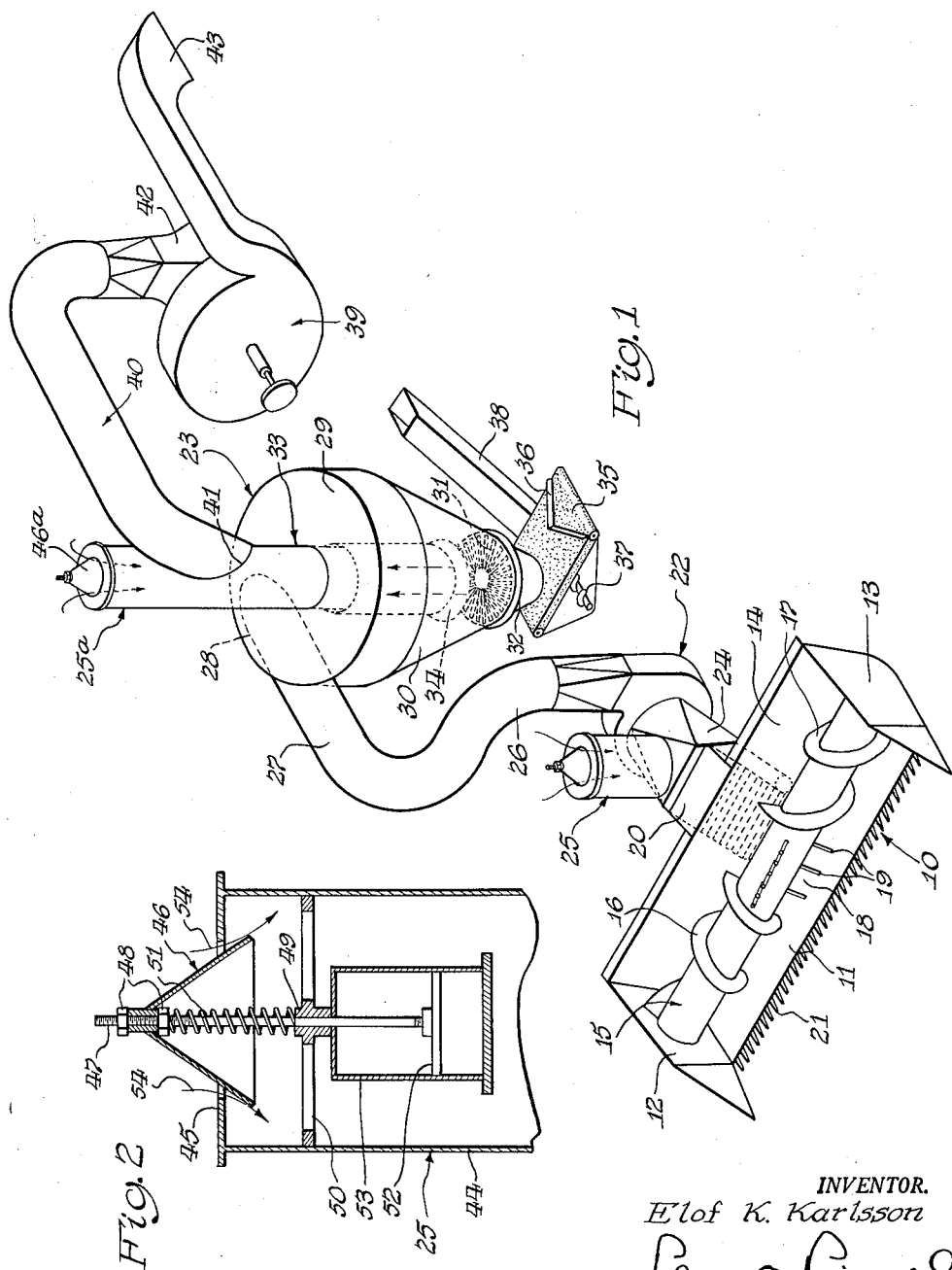

3,014,485
COMBINE
Elof Karl Karlsson, Moline, Ill., assignor to International Harvester Company, Chicago, Ill., a corporation of New Jersey
Filed Feb. 12, 1958, Ser. No. 714,884
3 Claims. (Cl. 130—27)

This invention relates to a new and improved combine.

More particularly the present invention is concerned with a modification and an improvement over the disclosure in the Patent No. 2,637,965 entitled Apparatus for Reaping Seed Crops. Generally this earlier patent shows a combine having a cyclone type grain cleaning and separating mechanism. The cyclone is equipped with a threshing fan just prior to the intake thereof which causes the grain to be threshed and all of the material blown into the cyclone for separation. Just following the cyclone is a suction and exhaust fan employed for the purpose of facilitating separation and exhausting trash and other material from the cyclone.

A principal object of the present invention is to provide air vents in association with the threshing fan and the suction and exhaust fan to thereby balance the air between the fans and thus contribute to more uniform threshing and grain separation.

An important object of this invention is the provision of means to automatically open and close air vents in a cyclone type harvester thresher when the air balance between the fans on both sides of the cyclone is disturbed from uneven feed or slugging.

Another and further important object of this invention is to supply an automatically operable air vent in association with a suction fan on a grain cleaning cyclone to thereby limit the suction in the cyclone to some predetermined maximum and thereby prevent clean grain from being exhausted with the trash and other foreign matter.

Other and further important objects and advantages will become apparent from the disclosures in the following specification and accompanying drawings.

In the drawings:

FIGURE 1 is a perspective view of the cyclone type harvester thresher of this invention;

FIGURE 2 is a sectional detail view of the air vents employed in the device of FIGURE 1.

As shown in the drawings, FIGURE 1 although being a perspective of the cyclone type harvester thresher, is somewhat schematic in form and it should be understood that the device includes suitable carrying mechanism and a source of power for facilitating movement over a field of standing grain.

The reference numeral 10 indicates generally a harvester platform having a grain receiving deck 11, end walls 12 and 13, and a rear wall 14. A grain converging auger 15 is journally mounted within the opposite ends 12 and 13 of the platform 10 and by means of oppositely disposed flight 16 and 17 on the auger 15 the harvested grain is moved centrally of the platform to a location shown at 18. The auger at its central portion is equipped with grain feeding fingers 19 which are adapted to move the converged grain rearwardly into a feeder housing and conveyor 20. The forward edge of the deck 11 of the platform 10 is equipped with a sickle 21 for cutting standing grain whereafter the grain falls rearwardly over the auger 15 causing the flight 16 and 17 to move the harvested grain centrally to the location 18 whereafter the fingers 19 on the auger 15 cause the grain to be moved downwardly and under the auger 15 over the deck 11 and thence into the feeder conveyor 20.

The feeder conveyor 20 delivers the harvested grain to an inlet tube 24 which is associated with a threshing fan 22. The threshing fan performs the functions of drawing harvested material into the fan, threshes the grain from its hulls, and delivers all of the material including grain, straw and any trash upwardly for deposit into the top of a cyclone 23. The inlet tube 24 has mounted thereon an automatically operable vent valve 25 which will be hereafter described in detail. The threshing fan delivers all of the material that passes therethrough upwardly out a vertically disposed tube 26 which turns horizontally and rearwardly at 27 for deposit into the top of the cyclone 23 at 28.

The cyclone 23 consists of an enlarged circular top portion 29 and a downwardly and inwardly inclined conical shaped body member 30. The lower end of the cone 30 is provided with a plurality of circularly disposed louvers 31. Beneath the louvers 31 is a clean grain discharge opening 32. A centrally disposed tube 33 passes through an opening in the top 29 and projects downwardly to an open bottom 34 spaced above the louvers or grates 31 some predetermined distance. Suction is provided on this discharge opening 34 of the tube 33 and the suction is of a degree sufficient to withdraw trash and other foreign matter from the cyclone 23 without disturbing the falling of grain through the louvered bottom 31 and out the opening 32. Beneath the opening 32 is a tailings conveyor 35 which has a deflector 36 built thereover. A clean grain auger 37 is arranged and constructed beneath the tailings conveyor 35 and is adapted to deliver the clean grain to an upwardly and rearwardly inclined elevator 38. The tailings from the conveyor 35 are delivered into the top of the cyclone 23 by means not shown. The clean grain is adapted to fall through the perforate conveyor 35 into the proximity of the auger 37 whereafter the clean grain is delivered to the elevator 38, either for delivery to a grain storage tank on the machine or into some other receptacle such as a trailing wagon or the like.

A suction fan 39 is disposed rearwardly of the cyclone 23 and by means of a connecting tube 40 is joined to the central stack or tube 33 at 41 and at its other end to the inlet 42 of the suction fan 39. A discharge spout 43 is provided on the fan 39. Another automatically operable vent valve is provided on top of the central stack 33 of the cyclone 23 and inasmuch as it is identical in structure and operation to the air vent valve 25 it will be given the same numerals with an "a" suffix. Thus the air vent valve provided on top of the stack 33 is indicated at 25a.

As best shown in FIGURE 2, the air vent valve 25 and 25a is shown in detail. For purposes of convenience the number 25 will be applied to FIGURE 2 and the other reference characters can be said to apply equally to either the valve 25 or the valve 25a. The valve 25 includes a generally vertically disposed cylindrical housing 44. The upper or top end of the cylindrical housing 44 is provided with a valve seat 45 which has cooperating therewith a conical shaped valve member 46. The valve 46 thus cooperates with the seat 45 and regulates passage of air from the outside of the tube to the inside thereof. The valve 46 has a generally vertically disposed rod-like member 47 at the center thereof which projects downwardly within the housing 44. The valve 46 is fastened to the rod member 47 by means of nuts 48. The rod 47 depending within the housing 44 is journally mounted for sliding movement in a bearing member 49 within a supporting cross member 50. The member 50 is not a full annular disk but merely a cross member which provides for the support of the sleeve-like journal or bearing 49 at the center of the tube 44. A spring 51 surrounds the shaft or rod member 47 between the bearing 49 and the nut 48 to thereby urge the valve 46 upwardly into a closed position with respect to the seat 45. The lower end of the rod 47 has a piston 52 mounted thereon and disposed within a cylinder or the like 53. The cylinder 53 and cooperating piston 52 comprise a dash pot for the valve 46 preventing sudden or jerky movements of the valve and thereby provide for smooth operation of the air venting mechanism. It is preferable that the valve 46 be slightly open at all times as shown in FIGURE 2 wherein air indicated by the arrows 54 may pass through the annular periphery between the valve 46 and the seat 45.

The fans 22 and 39 are in effect both blower and suction fans which are mounted on both sides of the cyclone. The fan 22 draws material into it for threshing and thence delivers material to the cyclone while the fan 39 removes by suction, separated material from the cyclone and thence blows the waste material out the exhaust spout 43.

In the operation of the cyclone harvester thresher, the machine is driven through a field of standing grain whereupon the sickle 21 cuts the grain stems near their bottom whereafter they fall rearwardly over the auger conveyor 15 to be delivered centrally thereof by the opposed auger flight 16 and 17. At this point the fingers 19 on the auger 15 carry the aggregated grain and stems downwardly and under the anger over the platform deck 14 and thence into the feeder conveyor 20. The feeder conveyor delivers grain upwardly for deposit into the tubular housing 24 and thence it is drawn into the threshing or blower fan 22. At this point the grain is threshed and the separated materials are both delivered upwardly through the tube 26—27 to the discharge spout 28 in the top of the cyclone 23. The material is then swirled around the inside of the conical shaped cyclone and by means of suction at the underside opening 34 of the central tube 33, the lighter trash material is drawn out through the central tube 33 for exit at the spout 41 of the tube 40 and thence into the suction fan 39 for discharge at 43. The grain cleaned by the cyclone drops through the louvers or grates 31 in the bottom of the cyclone and onto the tailings conveyor which is employed to receive unthreshed grain for return to the threshing mechanism. The clean grain drops through the conveyor 35 and into the scope of the auger 37 whereupon it is delivered to the elevator 38. An air balance is maintained between the fan 22 and the fan 39 when the grain carried through the machine is substantially uniform and as long as there is no jamming within the cyclone 23. However, when this balance is disturbed by an uneven feed or slugging, the air vents 25 and 25a come into operation to balance this air input and exhaust resulting in a substantially uniform grain threshing and cleaning despite uneven feeding or slugging of material within these various parts. The effectiveness of the suction of the fan 22 is limited by the air vent valve 25 and thus the amount of material delivered to the cyclone for swirling therewithin is limited by the air vent valve 25, as just described. When the combination fan and threshing cylinder 22 tends to draw in more material to be threshed than can be accommodated for efficient grain separation of the valve 46 of the vent 25 is pulled downwardly by this additional force against the action of the spring and the valve stem 47 is guided within the guide bushing 49 and retarded in its downward movement by the effects of the dash pot by the piston 52 within the cylinder 53. However, the valve 46 opens thus dividing the intake into the fan 22 in two branches and thereupon dropping the force of suction at the discharge of the feeder housing and causing a smaller amount of crop material delivered to the cyclone 23. Similarly, when the suction of the fan 39 becomes too great and there is a tendency for the suction to withdraw not only trash but grains and tailings, then it is prevented from doing so by an opening of the valve 46a as the suction pulls downwardly thereon and opens the valve against the action of the spring as described for the device of FIGURE 2. The valves 25 and 25a operate identically under similar amounts of pressure within the fan 22 and 39 and thus there is a general balance maintained between the fan 22 and the fan 39 which contributes to uniform threshing and grain cleaning and separation otherwise impossible to obtain.

Numerous details of construction may be varied throughout a wide range without departing from the principles disclosed herein and I, therefore, do not propose limiting the patent granted hereon otherwise than as necessitated by the appended claims.

What is claimed is:

1. In a harvester thresher of the type having a crop feeder, a cyclone, a first fan arranged and constructed to draw in harvester crop material, threshing such crop material and thereafter delivering threshed and unthreshed material to said cyclone, a second fan for removing trash from the cyclone, a first air vent mounted on said crop feeder forwardly of said first fan and operable in response to air pressure within said first fan, and a second air vent mounted on said cyclone forwardly of said second fan and operable in response to air pressure within said second fan whereby the material intake of the thresher is substantially balanced with the cyclone output for more efficient grain cleaning and separation.

2. A device as set forth in claim 1 in which the first and second air vents are substantially identical and each includes a cylindrical housing, a valve seat in the top of said housing, a vertically shiftable valve cooperating with said valve seat, and spring means normally urging said valve toward a closed position.

3. A device as set forth in claim 2 in which there is included with the first and second air vents a dash pot for the valve to prevent sudden or jerky movement of the valve.

References Cited in the file of this patent

UNITED STATES PATENTS

| | | |
|---|---|---|
| 1,149,463 | Pardee | Aug. 10, 1915 |
| 1,160,786 | Swanson | Nov. 16, 1915 |
| 1,791,673 | Karlson et al. | Feb. 10, 1931 |
| 2,637,965 | Simpson et al. | May 12, 1953 |
| 2,638,181 | Gordon | May 12, 1953 |